United States Patent [19]

Hamprecht et al.

[11] 3,872,167
[45] Mar. 18, 1975

[54] PRODUCTION OF O-SULFAMIDOBENZOIC ACIDS

[75] Inventors: Gerhard Hamprecht, Mannheim; Karl-Heinz Koenig, Frankenthal; Gerhard Bolz, Ludwigshafen, all of Germany

[73] Assignee: Badische Anilin- & Soda-Fabrik Aktiengesellschaft, Ludwigshafen/Rhine, Germany

[22] Filed: Jan. 26, 1972

[21] Appl. No.: 221,021

[30] Foreign Application Priority Data
Feb. 2, 1971 Germany............................ 2104682

[52] U.S. Cl............................................. 260/518 R
[51] Int. Cl........................................... C07c 143/80
[58] Field of Search ................................ 260/518 R

[56] References Cited
UNITED STATES PATENTS
3,632,628   1/1972   Suh ................................. 260/518 R Primary Examiner—Lorraine A. Weinberger
Assistant Examiner—L. A. Thaxton
Attorney, Agent, or Firm—Johnston, Keil, Thompson & Shurtleff

[57] ABSTRACT

The production of o-sulfamidobenzoic acids by reaction of anthranilic acid or one of its salts with a sulfamyl halide in the presence of a polar solvent at a temperature of from 15° to 40°C. The products are starting materials for the production of plant protection agents and dyes.

8 Claims, No Drawings

PRODUCTION OF O-SULFAMIDOBENZOIC ACIDS

The invention relates to a process for the production of o-sulfamidobenzoic acids by reaction of anthranilic acid or a salt of the same with a sulfamic halide in the presence of a polar solvent at a temperature of from 15° to 40°C.

It is known from French Pat. No. 735,765 that N-formyl-N-phenylsulfamyl chloride or N-acetyl-N-phenylsulfamyl chloride and anthranilic acid can be converted in boiling toluene as the reaction medium into N-phenyl-N'-(o-carboxyphenyl)-sulfamide. On an industrial scale the process gives unsatisfactory yields of end product. This disadvantage may also be deduced for example from German Pat. No. 1,120,456, Example 4, where methyl anthranilate is used as starting material. The lastmentioned patent discloses that N-formylsulfamyl chlorides may be used as starting materials for the production of o-sulfamidobenzoic acids.

The reaction of anthranilic acid with sulfamyl chloride at ice temperature in a mixture of ether and benzene is described in J. Amer. Chem. Soc., volume 84, pages 1994 et seq. This method also gives unsatisfactory yields of the end product.

All the said methods have secondary reactions involving the formation of for example anthranilic acid or methyl anthranilate hydrochloride and neutral condensation products. The isolation of the end products, which is carried out by way of an alkaline extraction, is not economical on an industrial scale. Reaction of anthranilic acid with a sulfamyl halide bearing only one free hydrogen atom on the nitrogen atom has not hitherto been described.

The object of the invention is a new process for preparing o-sulfamidobenzoic acids in better yields and purity by a simpler and more economical method.

We have found that o-sulfamidobenzoic acids of the general formula:

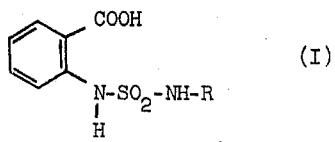

in which R is an aliphatic or cycloaliphatic radical are obtained advantageously by reacting anthranilic acid or one of its salts with a sulfamyl halide of the general formula:

in which R has the above meanings and X is halogen in the presence of a polar organic solvent at a temperature of from 15° to 40°C.

When N-isopropylsulfamyl chloride is used, the reaction may be represented by the following equation:

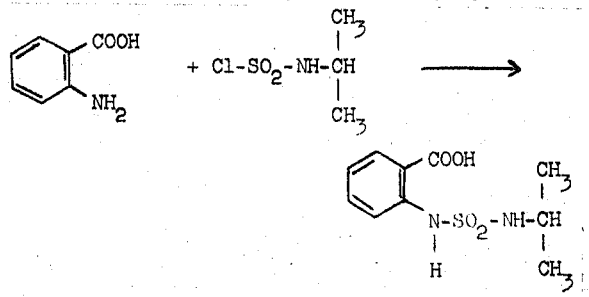

As compared with prior art methods, the process of the invention gives o-sulfamidobenzoic acids in better yields and purity and is simpler and more economical. N-carbonylation of the sulfamyl chloride prior to the reaction is not necessary. The working up of the reaction mixture is simpler because an alkaline extraction is not required. The reaction temperature of the invention offers economical advantages, because neither temperatures around or below 0°C nor temperatures above 100°C are necessary and energy for cooling or heating is thus saved. These advantageous results are surprising having regard to the prior art.

Anthranilic acid or an anthranilate may be reacted with the sulfamyl halide (II) in a stoichiometric ratio or with an excess of starting material (II), preferably in a ratio of from 1 to 1.2 moles of starting material (II) per mole of anthranilic acid. The anthranilates used are advantageously alkali metal or alkaline earth metal salts, for example the calcium, magnesium and particularly the potassium and sodium salts. Preferred starting materials (II) and accordingly preferred end products (I) are those in whose formulae R is linear or branched alkyl of one to six carbon atoms or cycloalkyl of five to eight carbon atoms and X is bromine or particularly chlorine. The said radicals may also bear, as substituents, groups and/or atoms which are inert under the reaction conditions, for example alkyl or alkoxy of one to four carbon atoms.

The following are examples of sulfamyl halides suitable as starting materials (II): N-methylsulfamyl, N-ethylsulfamyl, N-n-propyl sulfamyl, N-n-butylsulfamyl N-isobutylsulfamyl, N-isopropylsulfamyl,N-tert.-butylsulfamyl, N-cyclohexylsulfamyl, N-cyclopentyl-sulfamyl and N-cyclooctylsulfamyl chloride and the corresponding bromides.

The reaction is carried out in the presence of a polar organic solvent which is inert under the reaction conditions at a temperature of from 15° to 40°C, preferably at from 15° to 25°C, at atmospheric or superatmospheric pressure, continuously or batchwise. Solvents having a dipole moment of more than 1.2 are preferred. Houben-Weyl, "Methoden der organischen Chemie," volume 3/2, pages 361 et seq. may be referred to for a definition and the determination of the dipole moment. Examples of suitable solvents are halohydrocarbons such as methylene chloride, 1,1-dichloroethane, 1,2-dichloroethane, 1,2-cis-dichloroethylene, 1,1,1-trichloroethane, 1,1,2-trichloroethane, n-butyl chloride, 2-butyl chloride, 3-butyl chloride, isobutyl chloride, chlorobenzene, bromobenzene, iodobenzene, o-dichlorobenzene, m-dichlorobenzene, o-dibromobenzene, m-dibromobenzene, o-chlorotoluene, m-chlorotoluene, p-chlorotoluene, 1,2,4-trichlorobenzene, chloro-1,3,5-trimethylbenzene, 1,10-dibromodecane, 1,4-dibromobutane; N,N-disubstituted carboxamides such as dimethylformamide; ketones such as acetone, acetophenone, cyclopentanone and cyclohexanone; esters such as methyl acetate, isobutyl acetate, methyl benzoate and phenyl acetate; nitrohydrocarbons such as nitromethane, nitroethane, nitrobenzene, o-chloronitrobenzene, m-chloronitrobenzene, p-chloronitrobenzene and o-nitrotoluene; nitriles such as acetonitrile, benzonitrile and m-chlorobenzonitrile; tertiary amines such as pyridine, N-dimethylcyclohexylamine, N-dimethylaniline and α-methylpyridine; or mixtures of the same. Mixtures of polar solvents, for example ketones, with aromatic or aliphatic hydrocarbons, for example acetone and toluene or ligroin may be used. Mixtures of acetone with halohydrocarbons such as chlorobenzene are advantageous for commercial plant because of their high flashpoint. The polar solvent is advantageously used in an amount of 400 to 500 percent by weight based on starting material (II).

In a preferred embodiment of the process the reaction is carried out in the presence of an inorganic base, for example sodium carbonate, or preferably an organic base, conveniently a tertiary amine. An appropriate organic base may if desired be used as the polar solvent. Bases which may be used advantageously are trimethylamine, triethylamine, pyridine, α-picoline, β-picoline, γ-picoline, lutidine, N-dimethylaniline, N-diethylaniline, N-propylpiperidine, quinoline, isoquinoline, quinazoline, quinoxaline, triethanolamine, triamylamine, tri-n-butylamine, trifurfurylamine, trihexylamine, N-methylimidazole, N-methylpyrrole, N-ethylpiperidine, N-methylpyrrolidine, pyrazine, pyrimidine, acridine, phenonthridine, phenazine, N-dimethylcyclohexylamine and n-propyldiisopropylamine. The bases are generally used in an amount of from 1 to 1.2 moles per mole of starting material (II).

The reaction may be carried out as follows: a mixture of starting material, polar solvent with or without the base is kept over eighty to two hundred minutes at the reaction temperature. The starting mixture may be prepared in any way and in any sequence. It is advantageous to place the anthranilic acid in a reactor alone or mixed with the solvent and then to add simultaneously or separately the starting material (II) with or without the solvent and the base with or without the solvent. The mixture is then filtered if necessary and the end product is isolated from the filtrate by known methods, for example by concentration of the filtrate, stirring the residue into for example hydrochloric acid and filtering off the precipitate formed.

Compounds which can be prepared by the process according to the invention are valuable starting materials for the production of plant protection agents and dyes. Reference may be made to the abovementioned publications and Belgian Patent No. 702,877 regarding use.

The following Examples illustrate the invention. Parts given in the Examples are parts by weight.

EXAMPLE 1

48.7 parts of N-isopropylsulfamyl chloride and 39.4 parts of dimethylcyclohexylamine are introduced through two feedpipes over forty-five minutes at 15°C to 41.2 parts of anthranilic acid in 240 parts of acetone. The mixture is stirred for 2 hours at 23°C. After the hydrochloride formed has been suction filtered the filtrate is concentrated and stirred into 145 parts of hydrochloric acid (2% by weight). The precipitate formed is suction filtered, 61.7 parts of N-isopropyl-N'-o-carboxyphenylsulfamide (80 percent of theory) is obtained. It has a melting point of 158° to 161°C.

The yields of N-isopropyl-N'-o-carboxyphenylsulfamide specified below are obtained in the same way in the following solvents:

| Parts | Solvent (Ratio by weight) | Yield of sulfamide in % of theory |
|---|---|---|
| 190 | ethyl acetate | 97 |
| 210 | isobutyl acetate | 70 |
| 195 | methyl ethyl ketone | 76 |
| 195 | acetone/toluene (1:2) | 81 |
| 210 | acetone/chlorobenzene (3:16) | 82 |

EXAMPLE 2

17 parts of N-isopropylsulfamyl chloride is slowly added at 20° to 25°C to a mixture of 16.0 parts of the sodium salt of anthranilic acid in 63 parts of acetonitrile. The mixture is stirred for 2 hours at 23°C. After the mixture has been concentrated the oily residue is dissolved in 15 parts of methanol. The solution is added to 100 parts of water, and the precipitate formed is suction filtered and treated with 70 parts of hydrochloric acid (7% by weight). The end product is suction filtered and 16.8 parts of N-isopropyl-N'-o-carboxyphenylsulfamide (65% of theory) is obtained with a melting point of from 158° to 160°C.

EXAMPLE 3

17 parts of N-isopropylsulfamyl chloride is slowly added at 15°C to a mixture of 13.7 parts of anthranilic acid and 5.82 parts of sodium carbonate in 90 parts of ethyl acetate. After stirring for 2 hours at 23°C the mixture is concentrated. The residue is treated with 100 parts of hydrochloric acid (12% by weight), washed with water and dried. 17.3 parts of N-isopropyl-N'-o-carboxyphenylsulfamide (67% of theory) is obtained having a melting point of 161° to 162°C.

EXAMPLE 4 to 7

As described in Example 1, the starting materials (II) set out in the following Table are reacted at 23°C with anthranilic acid toform the corresponding end products (I):

| Ex. | Parts of (II) | Parts of (I) | m.pt.°C |
|---|---|---|---|
| 4 | 45.3 of N-methylsulfamyl chloride | 49.3 of N-methyl-N'-o-carboxyphenylsulfamide | 164–165 |
| 5 | 48.8 of N-ethylsulfamyl chloride | 52.8 of N-ethyl-N'-o-carboxyphenylsulfamide | 142–144 |
| 6 | 53.6 of N-n-propyl-sulfamyl chloride | 51.4 of N-n-propyl-o-carboxyphenylsulfamide | 135–137 |
| 7 | 40.5 of N-isobutylsulfamyl chloride | 44.1 of N-isobutyl-N'-o-carboxyphenylsulfamide | 139–140 |

We claim:
1. A process for the production of an o-sulfamidobenzoic acid of the formula:

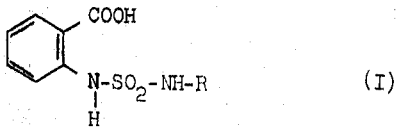 (I)

in which R is an aliphatic or cycloaliphatic radical, which process comprises reacting anthranilic acid or a salt of anthranilic acid with a sulfamyl halide of the formula:

 (II)

in which R has the above meanings and X is halogen in the presence of a polar organic solvent at a temperature of from 15° to 40°C.

2. A process as claimed in claim 1 carried out with from 1 to 1.2 moles of starting material (II) to each mole of anthranilic acid.

3. A process as claimed in claim 1 carried out at a temperature of from 15° to 25°C.

4. A process as claimed in claim 1 carried out with a solvent having a dipole moment of more than 1.2.

5. A process as claimed in claim 1 carried out with a solvent in an amount of 400 to 500% by weight based on starting material (II).

6. A process as claimed in claim 1 carried out in the presence of an inorganic base.

7. A process as claimed in claim 1 carried out in the presence of an organic base.

8. A process as claimed in claim 1 carried out using a base in an amount of from 1 to 1.2 moles based on each mole of starting material (II).

* * * * *